(12) United States Patent
Sinha et al.

(10) Patent No.: US 10,830,735 B2
(45) Date of Patent: Nov. 10, 2020

(54) SIMULTANEOUS REAL-TIME MEASUREMENT OF COMPOSITION, FLOW, ATTENUATION, DENSITY, AND PIPE-WALLTHICKNESS IN MULTIPHASE FLUIDS

(71) Applicant: Triad National Security, LLC, Los Alamos, NM (US)

(72) Inventors: Dipen N. Sinha, Los Alamos, NM (US); Anirban Chaudhuri, Cary, NC (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 16/495,612

(22) PCT Filed: Mar. 20, 2018

(86) PCT No.: PCT/US2018/023440
§ 371 (c)(1),
(2) Date: Sep. 19, 2019

(87) PCT Pub. No.: WO2018/175503
PCT Pub. Date: Sep. 27, 2018

(65) Prior Publication Data
US 2020/0088686 A1 Mar. 19, 2020

Related U.S. Application Data

(60) Provisional application No. 62/473,900, filed on Mar. 20, 2017.

(51) Int. Cl.
*G01N 29/024* (2006.01)
*G01F 1/66* (2006.01)
(Continued)

(52) U.S. Cl.
CPC ............. *G01N 29/024* (2013.01); *G01F 1/66* (2013.01); *G01P 5/18* (2013.01); *G01P 5/24* (2013.01)

(58) Field of Classification Search
None
See application file for complete search history.

(56) References Cited

U.S. PATENT DOCUMENTS

| 5,422,594 A | 6/1995 | Liao et al. |
| 8,135,360 B2 * | 3/2012 | Taki ..................... G06K 7/0008 340/10.1 |

(Continued)

FOREIGN PATENT DOCUMENTS

| CA | 2955165 A1 | 2/2016 |
| WO | WO-2016/161459 A1 | 10/2016 |

OTHER PUBLICATIONS

International Searching Authority, International Search Report and Written Opinion for International Application No. PCT/US2018/023440, dated Sep. 12, 2018, (12 pages), United States Patent and Trademark Office, USA.

*Primary Examiner* — Harshad R Patel
(74) *Attorney, Agent, or Firm* — Alston & Bird LLP

(57) ABSTRACT

Apparatus (10) and methods for making simultaneous measurements of composition (water-cut), fluid flow, and sound attenuation in a multiphase fluid flowing (15) through a pipe (12) in real-time, using the same apparatus (10) are described. Additionally, the apparatus (10) provides real-time pipe wall thickness monitoring for observing pipe corrosion or internal deposition. Knowledge of wall thickness is necessary to correct for water-cut (oil-water composition) automatically by adjusting the liquid path length internal to the pipe (spool). The use of short duration frequency chirp excitation signals (24) enables the apparatus to provide information that can be used to extract multiple levels of information from the same measurement in multiphase fluids including the presence of a significant quantity of gas (~60% gas volume fraction) in different flow regimes. Besides measuring steady flow, this device is useful for (Continued)

measurements during fast changing flows, such as for a rod-pumped well. Measurements up to about 1000 times a second can reliably be made.

20 Claims, 18 Drawing Sheets

(51) Int. Cl.
*G01P 5/18* (2006.01)
*G01P 5/24* (2006.01)

(56) References Cited

U.S. PATENT DOCUMENTS

| | | | |
|---|---|---|---|
| 9,354,094 B2* | 5/2016 | Sinha | G01F 1/663 |
| 9,404,890 B2* | 8/2016 | Sinha | G01N 29/348 |
| 2005/0288873 A1* | 12/2005 | Urdaneta | G05D 7/0635 |
| | | | 137/487.5 |
| 2006/0022680 A1* | 2/2006 | Suginouchi | G01F 23/2962 |
| | | | 324/635 |
| 2007/0224692 A1 | 9/2007 | Agar et al. | |
| 2007/0239002 A1 | 10/2007 | Alam | |
| 2008/0223148 A1* | 9/2008 | Cunningham | G01F 1/8477 |
| | | | 73/861.356 |
| 2009/0232338 A1 | 9/2009 | Song | |
| 2011/0080803 A1 | 4/2011 | Vu et al. | |
| 2011/0222577 A1 | 9/2011 | Bar-Cohen et al. | |
| 2012/0055239 A1 | 3/2012 | Sinha | |
| 2013/0197365 A1* | 8/2013 | Baba | A61B 8/54 |
| | | | 600/441 |
| 2014/0139818 A1 | 5/2014 | Sebastian et al. | |
| 2017/0082650 A1* | 3/2017 | Hies | G01F 1/667 |
| 2018/0113145 A1* | 4/2018 | Hies | G01F 1/662 |

* cited by examiner

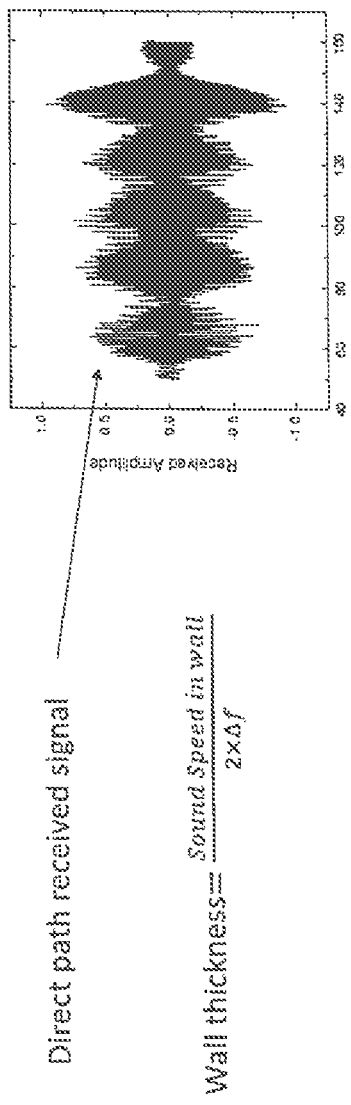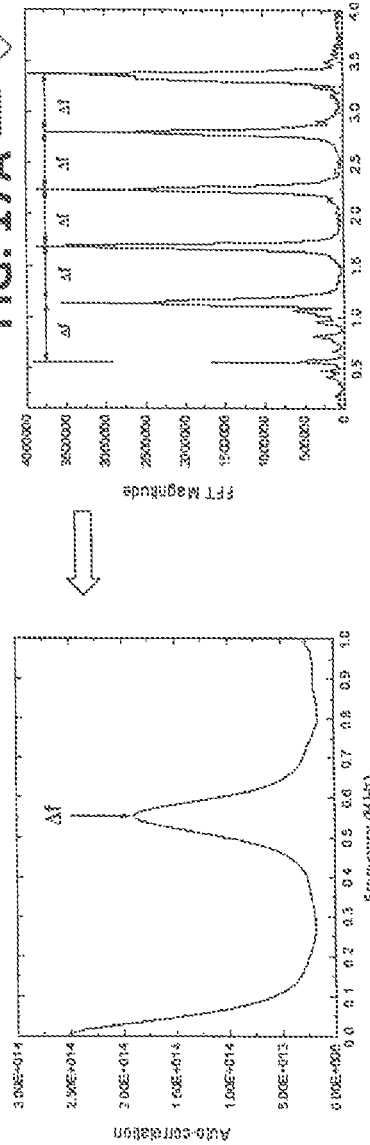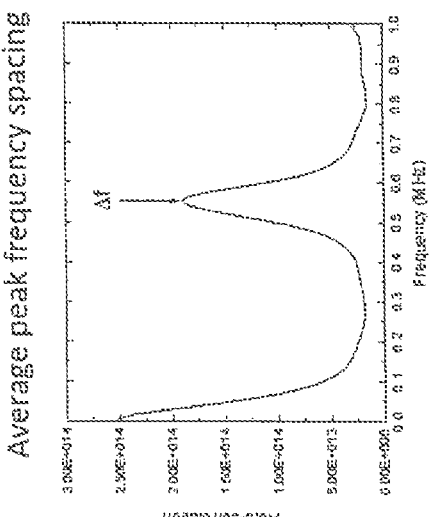
FIG. 17A
FIG. 17B
FIG. 17C

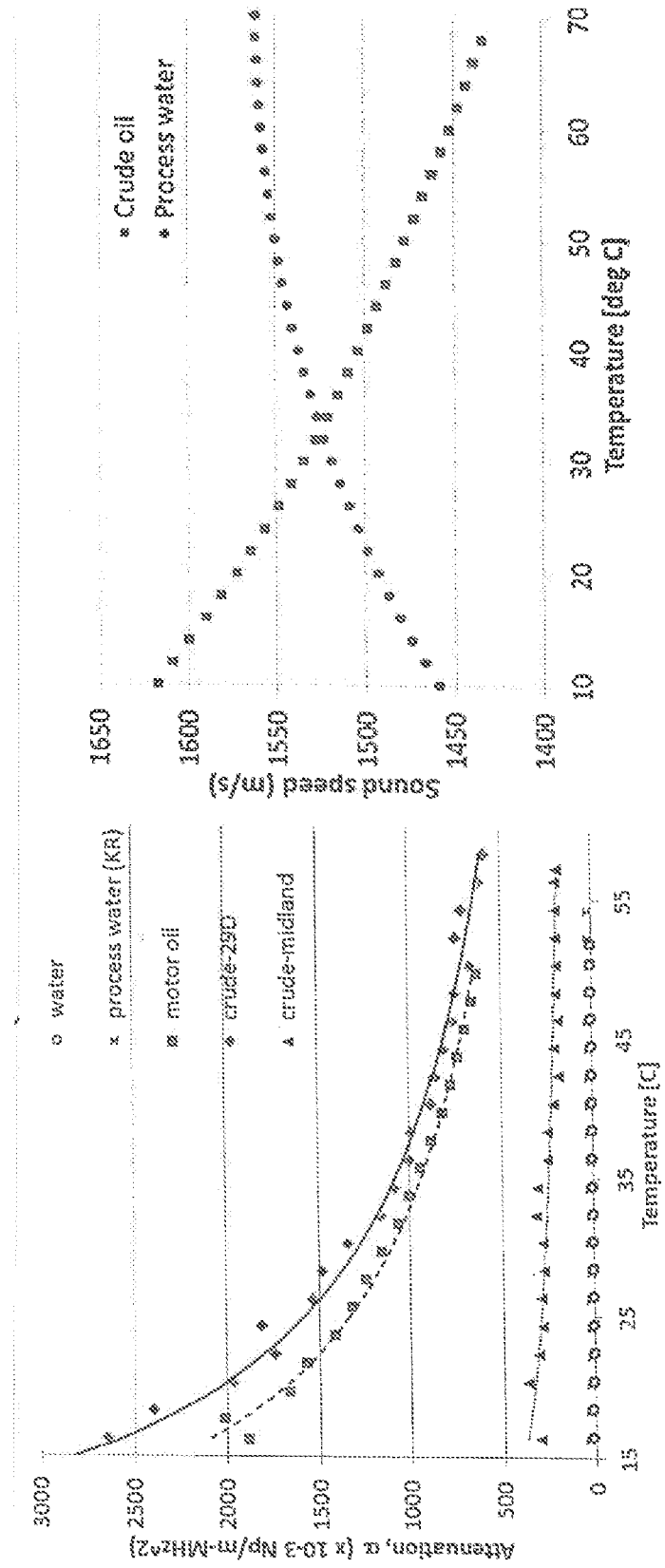

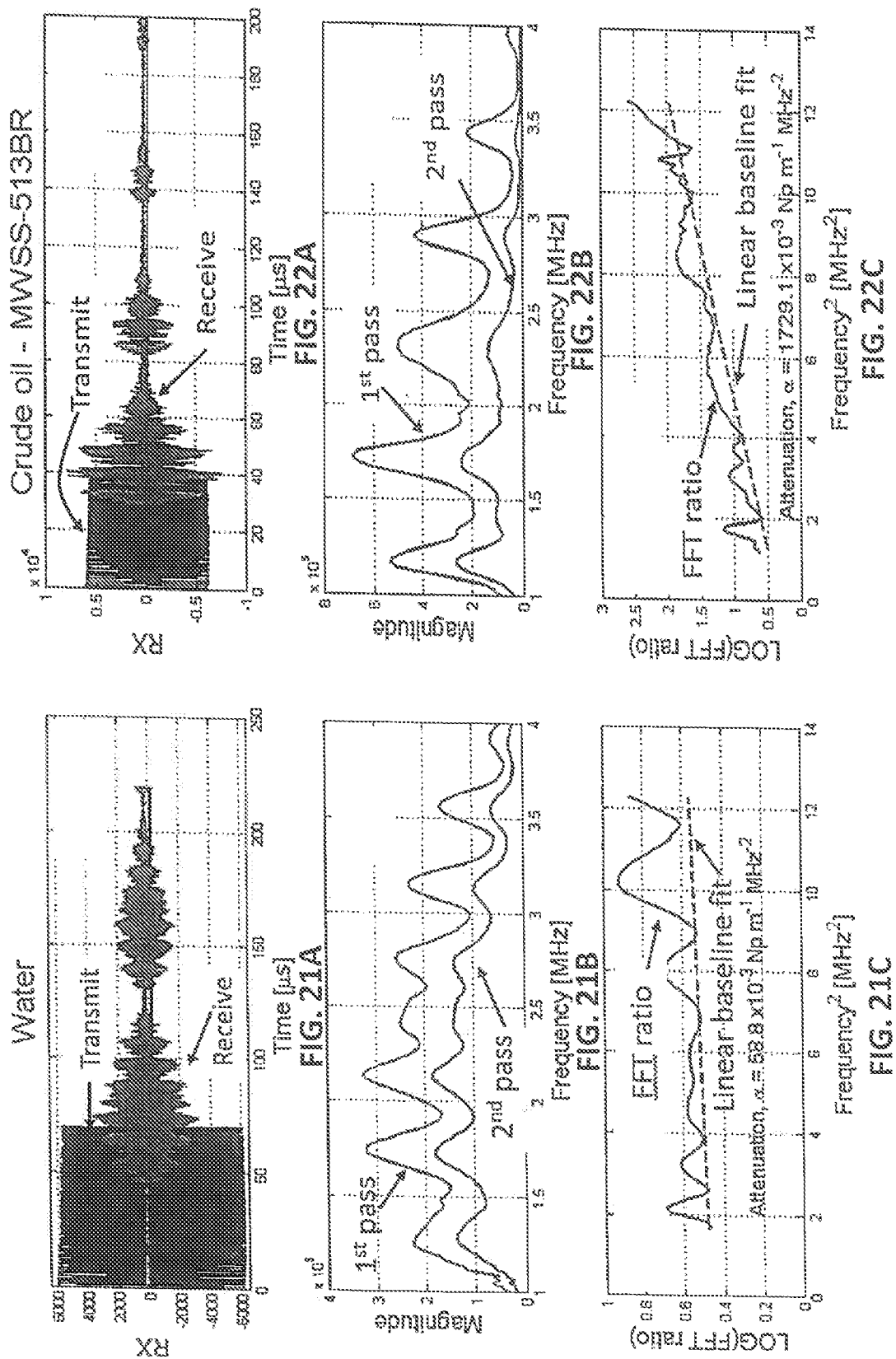

SIMULTANEOUS REAL-TIME MEASUREMENT OF COMPOSITION, FLOW, ATTENUATION, DENSITY, AND PIPE-WALL THICKNESS IN MULTIPHASE FLUIDS

CROSS-REFERENCE TO RELATED APPLICATIONS

The present application is a National Stage Application, filed under 35 U.S.C. 371, of International Application No. PCT/US2018/023440, filed Mar. 20, 2018, which application claims the benefit of and priority to U.S. Provisional Patent Application No. 62/473,900 for "Simultaneous Real-Time Measurement of Composition, Flow, Attenuation, Density, And Pipe-Wall Thickness In Multiphase Fluids" which was filed Mar. 20, 2017, the entire content of both of which as are hereby specifically incorporated by reference herein for all that it discloses and teaches.

STATEMENT REGARDING FEDERAL RIGHTS

This invention was made with government support under Contract No. DE-AC52-06NA25396 awarded by the U.S. Department of Energy. The government has certain rights in the invention.

BACKGROUND

Production testing has been an integral part of oil producing operations for many years. A rapid decline in production between tests may indicate a mechanical problem such as a rod part, worn pump, tubing leak, or a bad flow-line check valve that needs to be addressed. The change may also be due to a change in reservoir conditions related to secondary recovery operations. Various types of meters are in common use, for example turbine, positive displacement, orifice, ultrasonic and Coriolis meters. Most of these meters provide a single kind of measurement or require multiple instruments on a pipe spool to obtain multiple measurements parameters, such as water-cut and fluid flow. The presence of gas significantly and adversely affect these measurements to the extent that many instruments will not function if the Gas Volume Fraction, GVF, increases beyond 10%. Multiple types of flow measurement devices may then be required. Separation of the gas from the fluid in centrifugal separators may also be necessary. Microwave instrumentation may also be incorporated. This significantly increases both the original installation cost and operating cost, and maintaining multiple types of instruments increases the complexity of the instrumentation, requiring additional training and maintenance.

There is also a need to monitor corrosion of pipes or depositions on the inside of the pipe wall that is a problem in most oil-field operations. Currently, there are no continuous monitoring systems available or used in oil production. The available handheld systems provide spot checks, but require knowledge of the pipe materials.

In low temperature wells, Asphaltene and other dissolved impurities may precipitate from the oil. This changes the properties of the fluid from its original calibration, and ultrasonic metering systems will lose their sensitivity at temperatures where the sound speeds of oil and water become close to one another or become equal.

SUMMARY

In accordance with the purposes of embodiments of the present invention, as embodied and broadly described herein, the apparatus for noninvasive, simultaneous measurement of composition, density, fluid flow rate, wall thickness, and sound attenuation of a multiphase fluid comprising at least one liquid component and gas flowing in a pipe having a wall, an outside surface and an axis, hereof, includes: a first transmitting transducer in ultrasonic communication with the outside surface of the pipe for generating a first acoustic frequency chirp signal having a selected frequency range and duration in the multiphase fluid; a second acoustic transmitting transducer in ultrasonic communication with the outside surface of the pipe, disposed a chosen distance downstream from the first transmitting transducer for generating a second acoustic frequency chirp signal having the selected frequency range and duration in the multiphase fluid; a wave generator for generating an acoustic frequency chirp signal for causing the first transmitting transducer and the second transmitting transducer to simultaneously generate the first acoustic frequency chirp signal and the second acoustic frequency chirp signal, respectively; a first receiving transducer in ultrasonic communication with the outside surface of the pipe diametrically opposed to the first transmitting transducer for receiving the first acoustic frequency chirp signal generated by the first transmitting transducer after the first acoustic frequency chirp signal passes through the multiphase fluid, and for producing a first electrical signal in response thereto; a second receiving transducer in ultrasonic communication with the outside surface of the pipe diametrically opposed to the second transmitting transducer for receiving the second frequency chirp signal generated by the second transmitting transducer after the second frequency chirp signal passes through the multiphase fluid, and for producing a second electrical signal in response thereto; a first analog-to-digital converter for receiving the first electrical signal from said first receiving transducer, and for generating a first digital signal therefrom; a second analog-to-digital converter for receiving the second electrical signal from the second receiving transducer, and for generating a second digital signal therefrom; and a digital signal processor for controlling the wave generator, and for receiving the first digital signal and the second digital signal, and for storing and processing the first digital signal and the second digital signal.

In another aspect of embodiments of the present invention, and in accordance with the purposes thereof, as embodied and broadly described herein, the method for noninvasive, simultaneous measurement of composition, density, fluid flow rate, wall thickness, and sound attenuation of a multiphase fluid comprising at least one liquid component and gas flowing in a pipe having a wall, an outside surface and an axis, hereof, includes: generating first acoustic frequency chirp signals in the multiphase fluid using a first transmitting transducer in ultrasonic communication with the outside surface of the pipe; generating second acoustic frequency chirp signals in the multiphase fluid using a second acoustic transmitting transducer in ultrasonic communication with the outside surface of the pipe, disposed a chosen distance downstream from the first transmitting transducer, simultaneously with the generation of the first acoustic frequency chirp signals; receiving the first acoustic frequency chirp signals after the first acoustic frequency chirp signals pass through the multiphase fluid, and producing first electrical signals in response thereto using a first receiving transducer in ultrasonic communication with the outside surface of the pipe diametrically opposed to the first transmitting transducer; receiving the second acoustic frequency chirp signal after the second frequency chirp signal passes through the multiphase fluid, and producing second electrical signals, in response thereto using a second receiving transducer in ultrasonic communication with the outside surface of the pipe diametrically opposed to the second transmitting transducer; simultaneously calculating the root-mean-square values for each first electrical signal and each second electrical signal; inserting the root-mean-square values for the first electrical signal into a queue for a first, first-in-first-out memory, and continuously inserting the root-mean-square values for the second signal into a queue for a second, first-in-first-out memory, whereby a first waveform and a second waveform are generated; cross-correlating the first waveform with the second waveform, whereby a time delay in a fluctuation in the first waveform and observed in the second waveform is calculated, from which the flow velocity of the multiphase fluid is determined; determining the transit time of the first acoustic frequency chirp signal through the fluid from which the composition of the multiphase fluid is calculated; obtaining a fast Fourier transform of a first received acoustic frequency chirp signal, from which the wall thickness is obtained; and measuring the decay in amplitude of a first received acoustic frequency chirp as a function of number of traverses of the multiphase fluid, from which the sound attenuation and the density of the multiphase fluid is obtained.

Benefits and advantages of embodiments of the present invention include, but are not limited to, providing an apparatus and methods for simultaneous and real-time determinations of water-cut, fluid flow, which takes advantage of the presence of gas, wall-thickness for evidence of corrosion or accretion, sound attenuation, which is important for low temperature wells, and fluid density, using only two pairs of transducers.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 17A-17C pictorially illustrate wall thickness determination using the received signal only, with FIG. 17A representing a typical receive signal, FIG. 17B illustrate a fast Fourier Transform, FFT, of this signal showing a periodic pattern of wall resonances that occur at integral numbers and are equally spaced in frequency, and FIG. 17C illustrates auto-correlation of the data in FIG. 17B showing a pronounced peak corresponding to the average peak spacing in FIG. 17B.

FIG. 20A is a graph of the sound speed as a function of temperature for crude oil and water, while FIG. 20B is a graph of the attenuation of several oils and two water samples as a function of temperature.

FIGS. 21A-21C are graphs of the transmitted and received chirp signals as a function of time for a water sample, the analysis of the received signal as a function of frequency (frequency-domain analysis), and the calculated attenuation as a function of the square of the frequency, respectively.

FIGS. 22A-22C are graphs of the transmitted and received chirp signals as a function of time for a crude oil sample, the analysis of the received signal as a function of frequency (frequency-domain analysis), and the calculated attenuation, as a function of the square of the frequency, respectively.

FIG. 23 is a graph of the measurements of attenuation using the frequency-domain ratio approach for several fluids as presented in FIGS. 21A-21C and 22A-22C, above, as a function of temperature, the plots showing the large variation in sound attenuation in the fluids in the temperature range where the sound speeds for crude oil and water are similar.

DETAILED DESCRIPTION

Briefly, embodiments of the present invention include apparatus and method for performing simultaneous, real-time measurements of composition (water-cut), fluid flow, and sound attenuation in a multiphase fluid flowing through a pipe. Multiple measurements are simultaneously made using the same transducers, thus reducing the cost of instrumentation and field implementation. It should be mentioned that although all of the data required for the determination of these quantities is simultaneously made, the required calculations occur rapidly thereafter such that the quantities may be displayed in real time.

In what follows, the terms "simultaneously" and "simultaneous" mean that the acoustic frequency chirp signals directed into the multiphase fluid from each of the two transmitting transducers are transmitted into the fluid at the same time, and that the received signals are processed without delay. This simultaneity of transmitted signal pairs remains true for all of the acoustic frequency chirp signals utilized in the measurements in accordance with the teachings of embodiments of the present invention.

Ultrasonic metering systems, based on sound speed, lose their sensitivity at low temperatures (typically below 40° C. depending on the type of crude oil) where the sound speed of oil and process water become close to each other or equal. Sound attenuation, by contrast diverges for these substances as the temperature is lowered, thereby providing sensitive measurements in regions where sound speed alone cannot provide accurate measurement for fluid composition. The analysis that provides sound attenuation also permits determination of the fluid density.

Additionally, the apparatus provides real-time pipe wall thickness monitoring for monitoring pipe corrosion or internal deposition. This measurement is necessary to automatically correct for water-cut (oil-water composition) by adjusting the liquid path length internal to the pipe (spool). The use of a short duration frequency chirp excitation signal enables the device to provide information that can be used to extract multiple levels of information from the same measurement. The apparatus works well in multiphase fluids, and in the presence of a significant quantity of gas (~60% gas volume fraction—GVF) in different flow regimes. In addition to measuring steady flow, the present apparatus is useful in situations where the flow is rapidly changing, such as in a rod-pumped well, since all measurements are obtained as fast as 1000 times a second.

Figure 1:
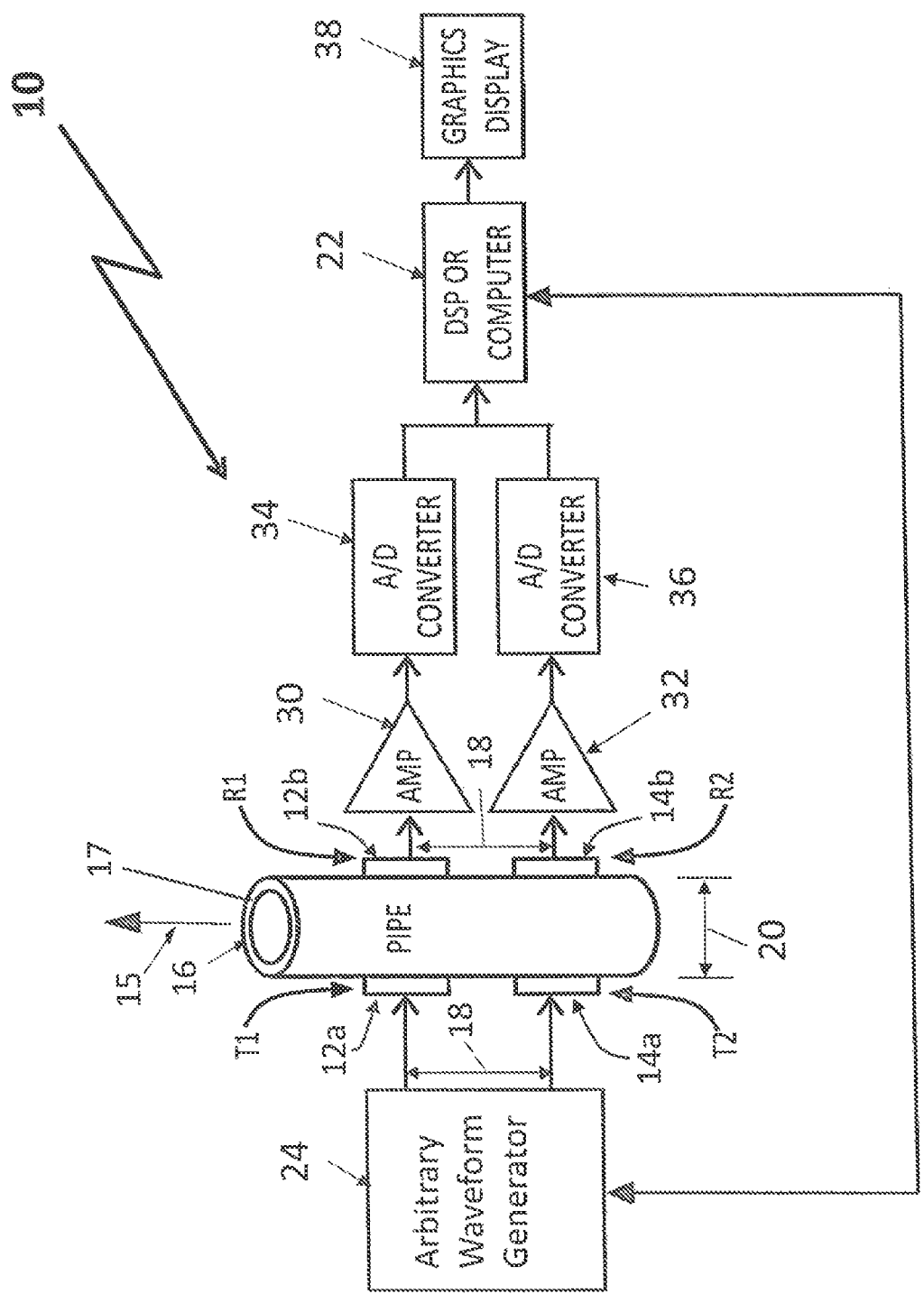
FIG. 1 is a schematic representation of a generalized embodiment of the apparatus of the present invention.

Reference will now be made in detail to the present embodiments of the invention, examples of which are illustrated in the accompanying drawings. In the FIGURES, similar structure will be identified using identical reference characters. It will be understood that the FIGURES are presented for the purpose of describing particular embodiments of the invention and are not intended to limit the invention thereto. Turning now to FIG. 1, a schematic representation of a generalized embodiment of apparatus, 10, of the present Invention is shown. Two transmitter/receiver pairs of diametrically opposed broadband ultrasonic transducers 12a,b, and 14a,b, (e.g., piezoelectric, for non-contact measurements on metal pipes through which fluid, 15, is flowing are in vibrational communication with pipe, 17, and separated by a certain known distance, 18, typically 1.3 pipe diameters, 20. Electromagnetic acoustic transducers (EMATs) and transducers in contact with the outside surface of conduit (e.g., pipe), 16, and separated by the certain known distance, 18, typically 1-3 pipe diameters, 20 may also be used. Separation 18 can be adjusted for different flow ranges. Transducers 12a,b and 14a,b may have curved surfaces to match the curvature of a pipe, or have a flat-to-curve metal adapters, or the sides of the pipe can be machined to a have flat surface to accommodate flat transducers.

Computer-controlled, 22, dual channel Arbitrary Wave Generator (AWG) (a digital signal processor (DSP) or microcontroller may also be used), 24, is used along with drive amplifiers (not shown in FIG. 1) to simultaneously excite the transmitters T1, 12a and T2, 14a. A two channel AWG may be used when the transducer pairs are not properly matched in their electrical impedance or the ultrasonic coupling is different for each transducer. This provides flexibility for device implementation in the field. In most situations, however, a single channel AWG can be used to drive both transducer pairs.

Low-level output signals, 26, and 28, from the receiving transducers are first amplified by individual signal amplifiers, 30, and 32, respectively, and then digitized by multi-channel analog-to-digital (A/D) converters, 34, and 36, respectively, having variable sampling rates that can be varied between 25 MHz and 100 MHz. Typical A/D resolutions are 14-bits but can be higher or lower, if warranted. The digitized signals are directed to DSP 22 having fast memory, such that DSP 22 can process the stored signal almost in real-time. Display device, 38, is used to visually output the results. An Ethernet or other wireless link may be used to transmit the data to a central location (not shown in FIG. 1).

Figure 2:
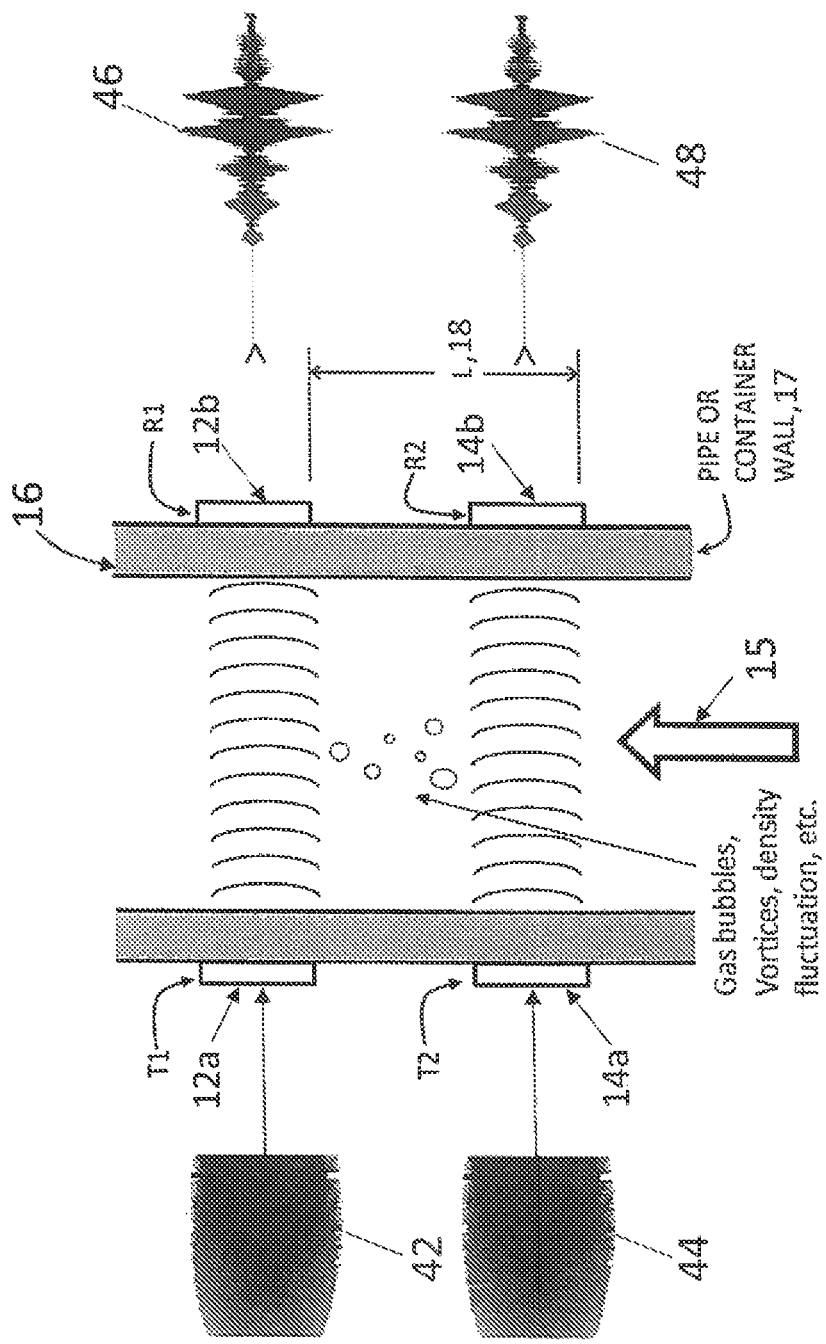
FIG. 2 is a schematic representation of the apparatus of FIG. 1 used for fluid flow measurements.

A. Fluid Flow Measurements:

1. Measurement:

Flow measurements based using the apparatus described in FIG. 1 are described in FIG. 2. Diametrically opposed, ultrasonic transducer transmitter-receiver pairs (T1,R1 (12a, b) and T2,R2 (14a,b)) are clamped pipe section 16 and slightly displaced from each other along the axis of the pipe (separation L, 18) through which multiphase fluid, 40, is flowing. Separation distance 18 is related to pipe diameter 20 and is typically in the range of 1-3 pipe diameters, but can be longer. Frequency chirped signals (from 300 kHz to 5 MHz), 42, and 44, having a chosen duration that is shorter than twice the transit time through the fluid is applied to transmitters 12a and 14a, respectively. The short duration avoids ultrasonic resonances from being generated in the liquid, similar to what occurs in a conventional ultrasonic correlation flowmeter that typically use continuous wave mode excitation having a fixed frequency. The transmission of this fixed frequency signal can be poor unless it is matched with the wall resonance frequency. The frequency chirp signal spans multiple resonances of the pipe wall as shown by the amplitude-modulated received signal for each transducer, 46, and 48. The signals that are transmitted through the fluid in parallel are received by receiver transducers 12b and 14b. Disturbances, such as turbulence (vortices), presence of gas (gas bubbles, as an example), or density fluctuations attenuate the transmitted signal in a dynamic manner as these are transient disturbances. Because of the fluid flow, up-stream receiver 14b first detects this fluctuation in transmission (the signal can even be completely blocked). Depending on the velocity of the fluid, down-stream receiver 12b detects the disturbance somewhat later. The received chirp signal can be bandpass filtered in a narrow frequency band or the entire signal can be used. The peak or rms (root-mean-square) value for each received chirp signal that may be generated at a very high rate, for example, as fast as 10 kHz repetition rate is measured. At this rate, one obtains transmitted signal intensity data each millisecond. When these peak or rms data are plotted for each receiver channel the signal that one would obtain from a conventional CW ultrasonic correlation flowmeter is recovered, but with advantages that overcome the shortcomings of such conventional flowmeters.

Figure 3:
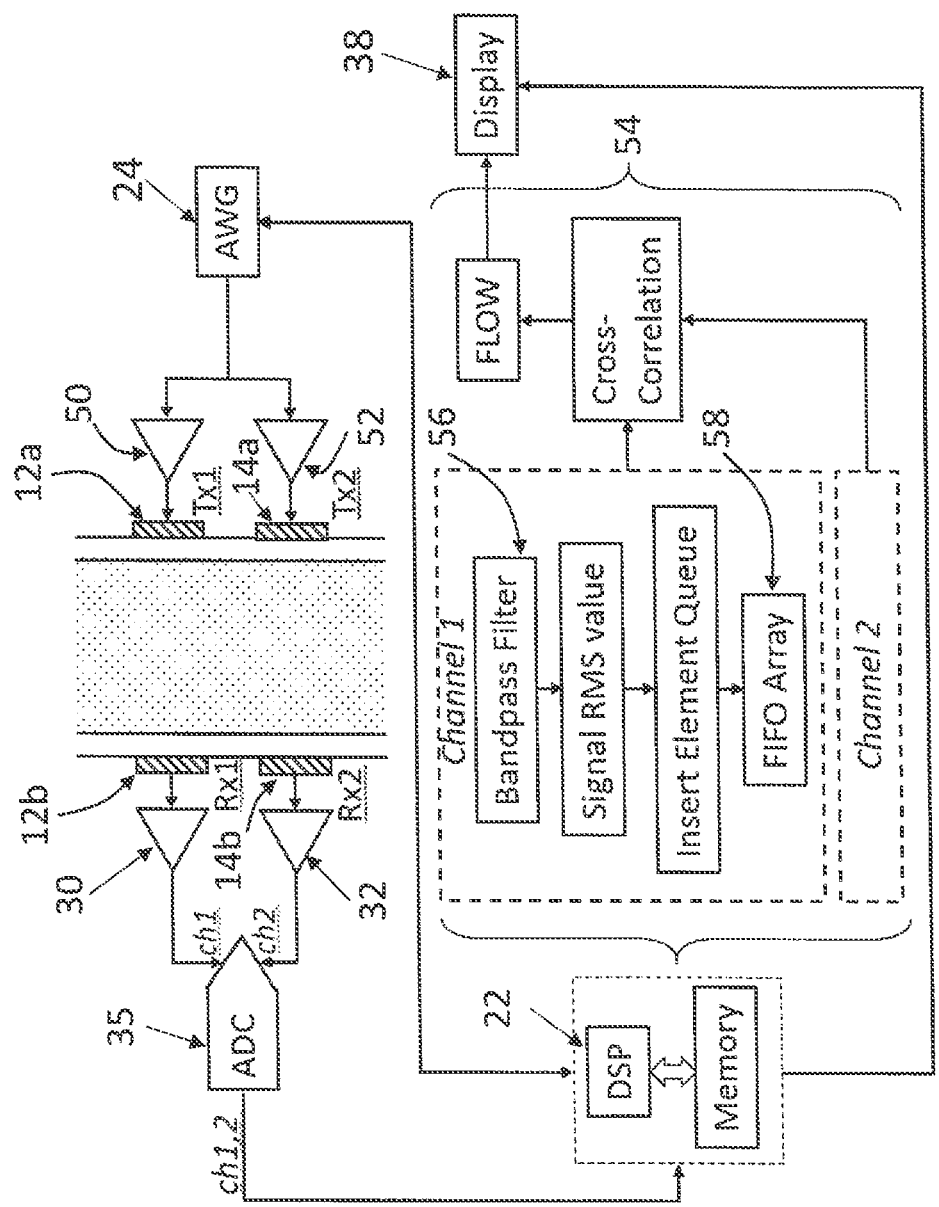
FIG. 3 is a schematic representation of the electronic components for data processing of the flow measurements of FIG. 2, the portion within the curly brackets showing the operations performed by the DSP and the memory.
Figure 4A:
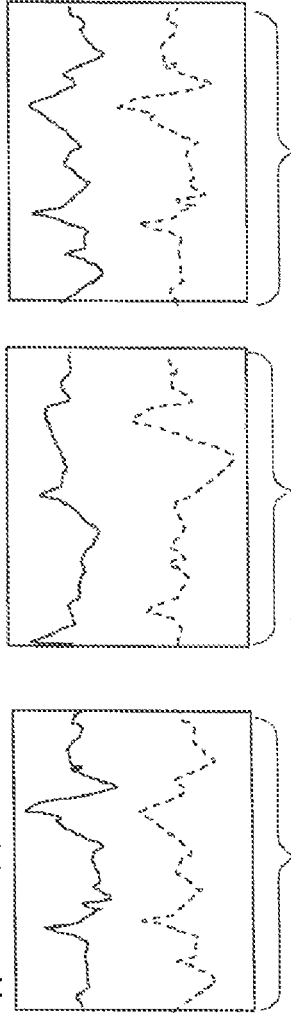
FIG. 4A illustrates conventional flow measurements typically occurring at one measurement per 1-2 s, when compared with the high speed sliding window FIFO memory technique of FIG. 4B, which permits measurements to be taken at the chirp signal repetition rate.
Figure 4B:
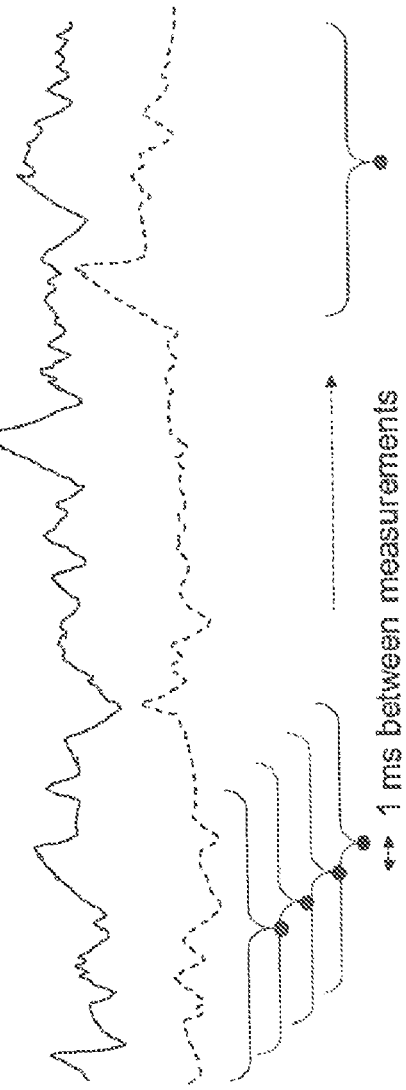

2. Data Processing:

FIG. 3 is a schematic representation of the data processing for the flow measurements of FIG. 2. Only a single AWG 24 triggered and controlled by DSP 22 is shown for simplicity. Data from each channel are processed simultaneously and in parallel. An expanded view of the processing steps for each channel is shown within curly brackets, 54. The received signal is first bandpass filtered by filter, 56. Four different bandpass frequency regions may be selected for filtering, each covering a different resonance peak region, but even a single region that includes one wall resonance peak (see the peaked amplitude region in the received signal) is sufficient. A larger region that covers multiple resonances is also adequate. For high speed operation, a single bandpass filter with a frequency region that covers multiple resonance peaks is often used. Once filtered, the root mean squared (rms) value is determined for that bandpass frequency region. This rms value provides a measure of the signal amplitude fluctuation from one chirp to the next as the flow measurement is based on this fluctuation observed by each of the two receivers. The rms value for each chirp signal is then inserted into the queue of first-in-first-out (FIFO) memory, 58, in a continuous manner that generates a waveform (see FIGS. 4 and 5 below) that shows how the rms fluctuation from each receiver behaves over time. The FIFO memory allows the simultaneous extraction of a portion of the waveform during the time while the memory is continuously getting filled. Therefore, a fixed number of data points (100 to 1000) on the waveform is extracted, separated by the repetition rate of the chirp (e.g., 1 ms). This is equivalent to sliding a window one data step at a time and capturing that waveform. The window data from the two channels are then cross-correlated using Fast Fourier Transform (FFT) to determine a delay time peak signal $t_d$ that is related to the flow as as flow velocity=$L/t_d$, since the transducer separation L is known (see FIG. 2). FIG. 4A illustrates conventional flow measurements typically occurring at one measurement per 1-2 s, when compared with the high speed sliding window technique of FIG. 4B presented here, a waveform is continually obtained that is shifted only by a single chirp in time and, therefore, a cross-correlation peak (corresponding flow speed) at the chirp rate is obtained. It is seen that there is a factor of 1000 improvement in measurement speed using the sliding window technique, permitting measurements to be made at the chirp repetition frequency.

Typically, correlation flow measurements are made by capturing a portion of the data from both channels and then cross-correlating that portion of the data from both channels to determine the delay time to obtain a single flow value. Then one moves to the next capture window and determines the next flow value. Since it takes approximately 1000 data points in each curve to obtain an accurate cross-correlation to determine flow, measurements of flow can be made only every 1-2 seconds. With the present FIFO technique, flow measurements can be made as rapidly as the chirp rate, for example, one measurement every 1 ms. This is an improvement of three orders-of-magnitude over the conventional approach. When the process begins, one awaits data for the first window to be captured, after which the process proceeds in a continuos manner.

Figure 5:
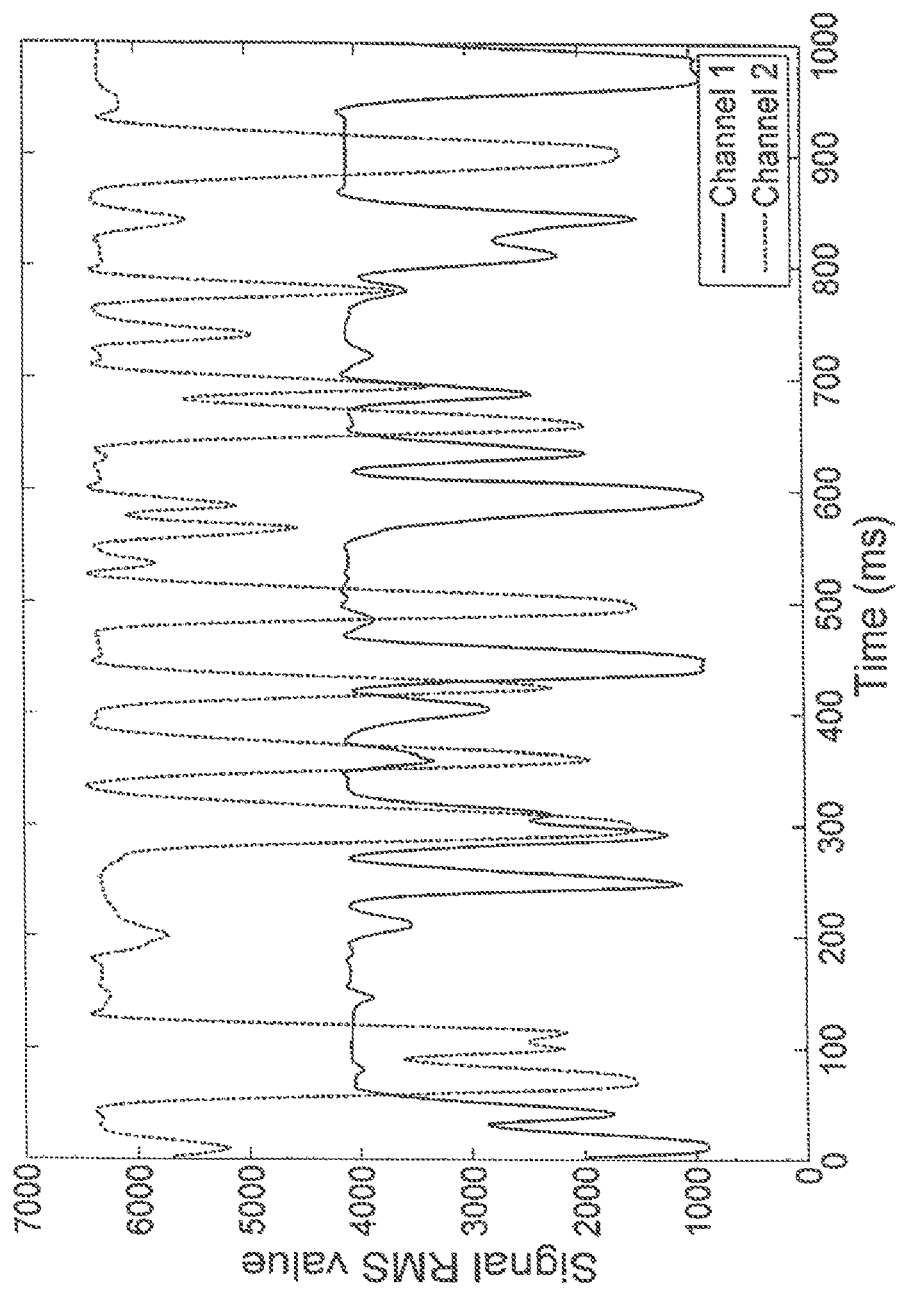
FIG. 5 is a graph of the observed rms values for channels 1 and 2 at a mean liquid flow rate equal to 4.25 gallons per minute.
Figure 6:
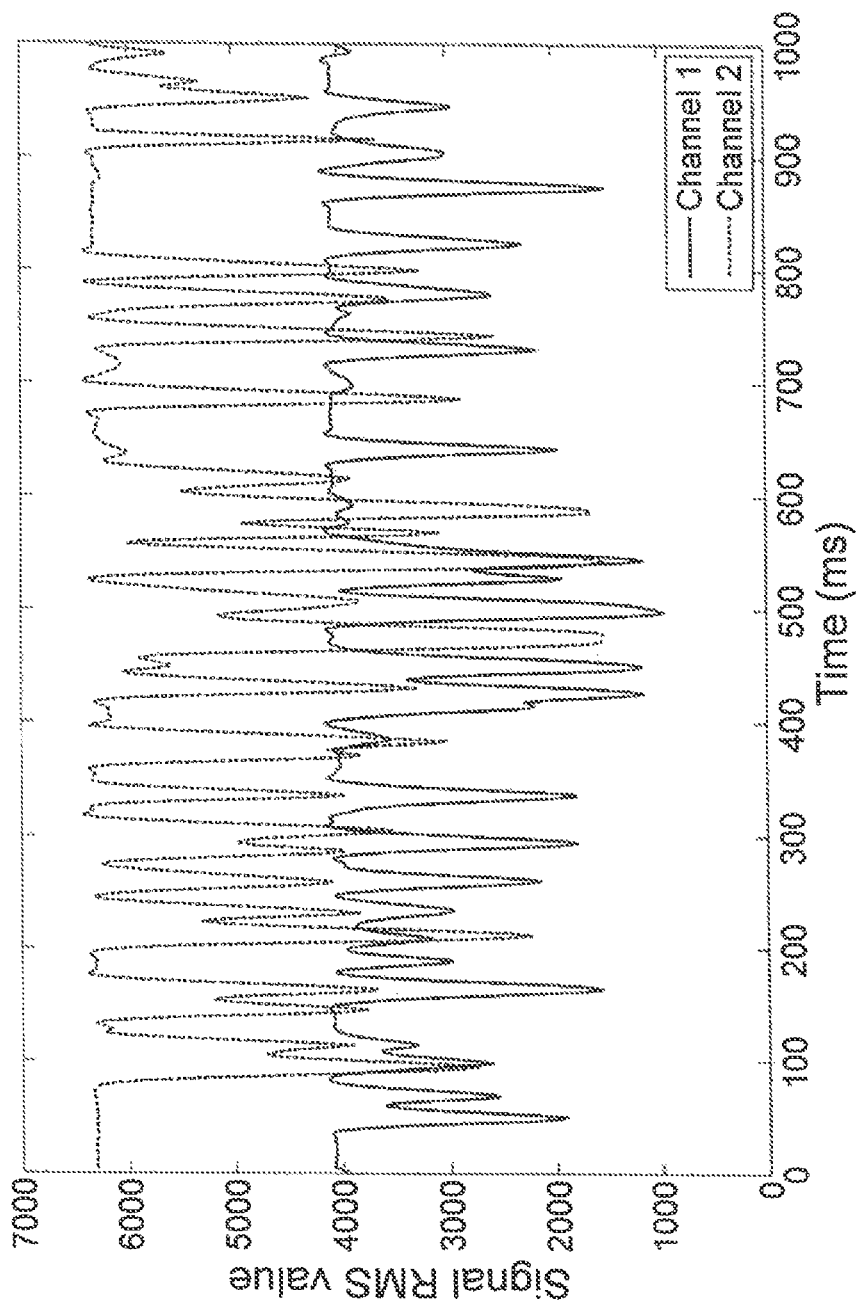
FIG. 6 is a graph of the observed rms values for channels 1 and 2 at a mean liquid flow rate equal to 8.95 gallons per minute.

FIG. 5 illustrates the observed rms values for channels 1 and 2 at a mean liquid flow rate equal to 4.25 gallons per minute, while FIG. 6 shows the observed rms values for channels 1 and 2 at a mean liquid flow rate equal to 8.95 gallons per minute. As may be observed from FIGS. 5 and 6, the transmission fluctuations occur at a higher rate at higher flow rates as can be expected.

Figure 7:
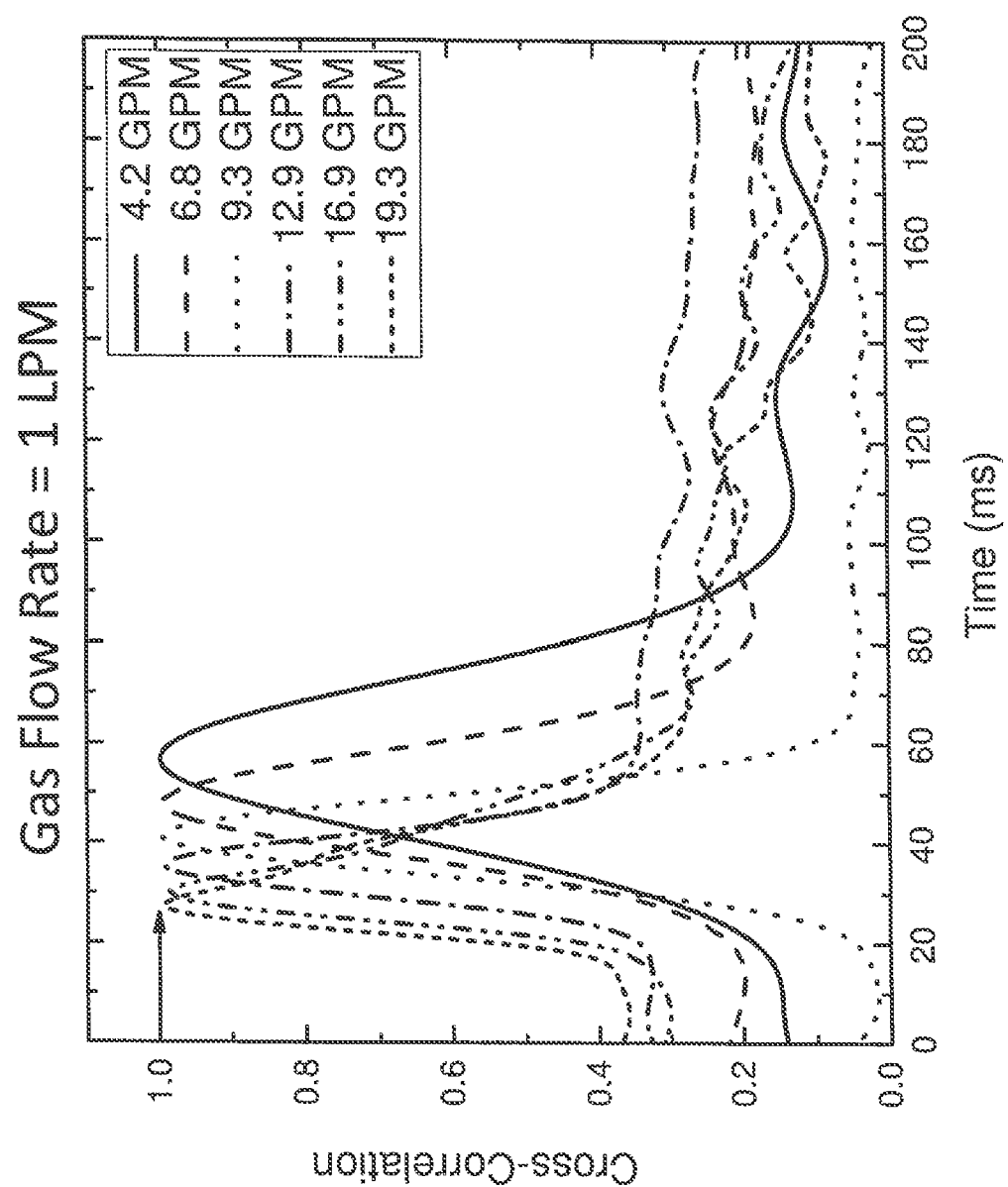
FIG. 7 is a graph of the cross-correlation peak, and the associated delay for different fluid rates and with 1 liter per minute of air passing through the liquid.
Figure 8:
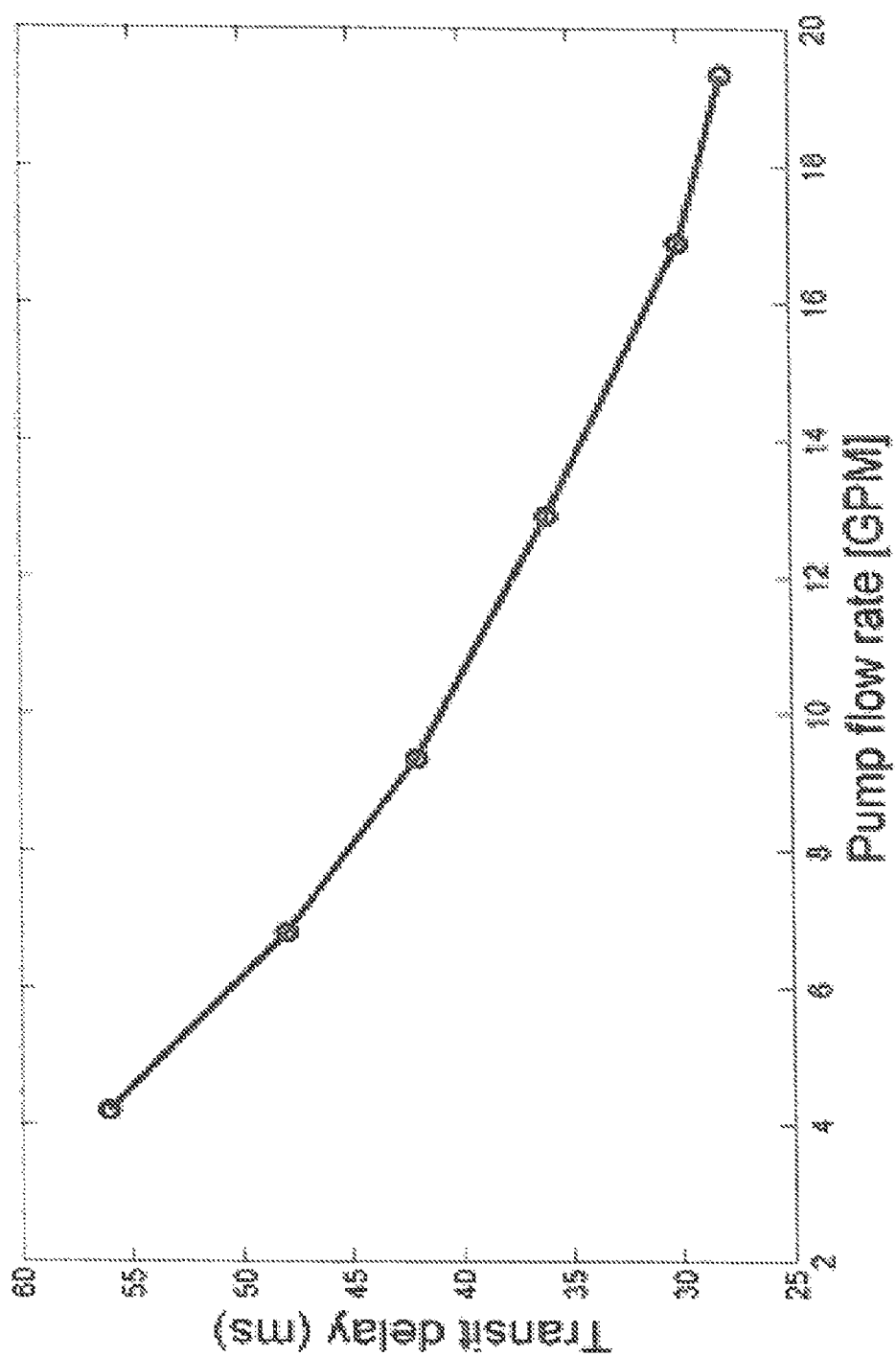
FIG. 8 is a graph illustrating the observed cross-correlation transit delay (delay between two channels) as a function of fluid flow rate measured separately with a calibrated instrument.

FIG. 7 is a graph of the cross-correlation peak, and the associated delay for different fluid rates and with 1 liter per minute of air passing through the liquid. As the flow rate increases, the position of the peak moves toward shorter delays in a monotonic manner. FIG. 8 illustrates the observed cross-correlation transit delay (delay between two channels) as a function of fluid flow rate measured separately with a calibrated instrument. This curve is a calibration curve for apparatus used.

Figure 9:
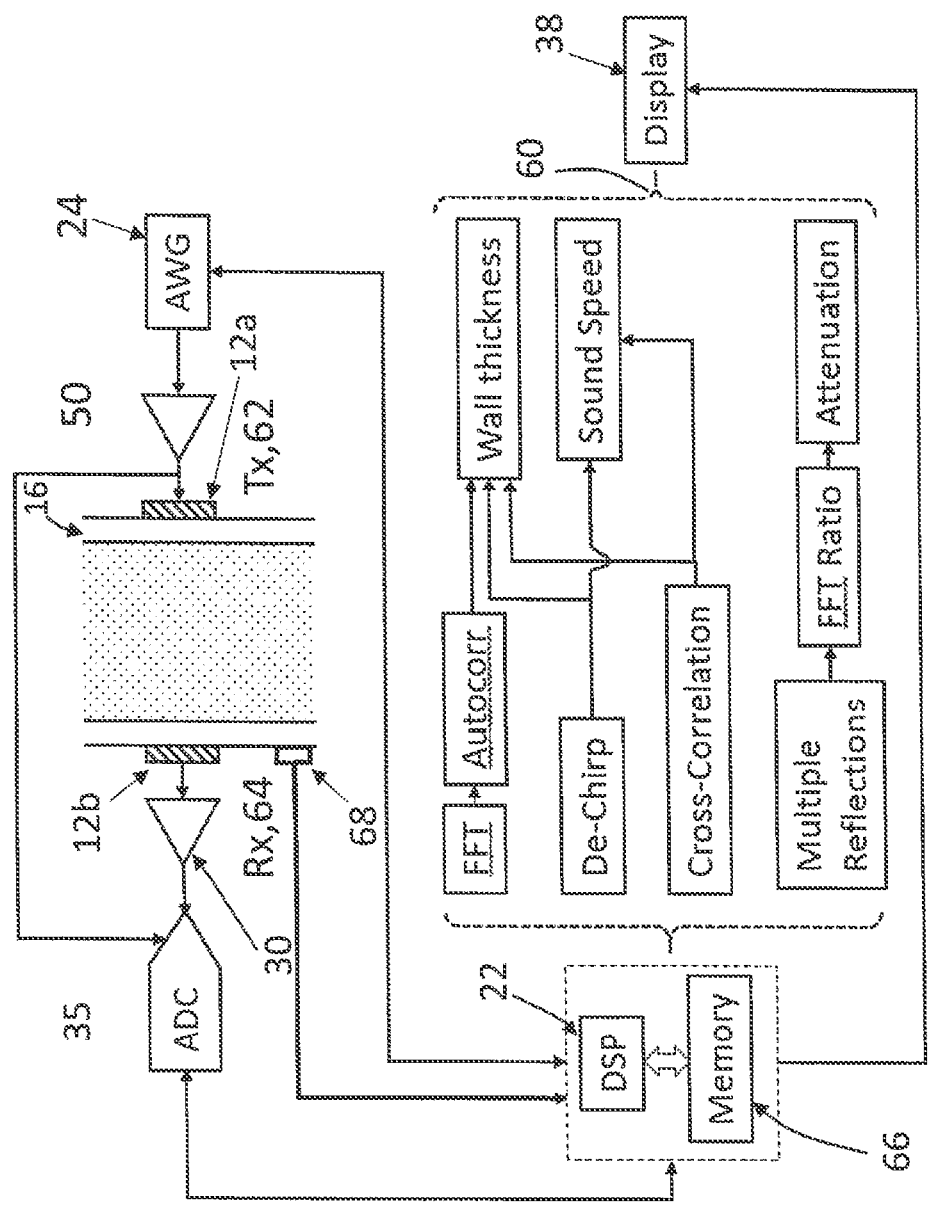
FIG. 9 is a schematic representation of the use of a single channel for data processing where the same frequency chirp is used as in FIG. 3 hereof, but the same data are simultaneously processed in a different manner to obtain the pipe wall thickness, the sound speed and the fluid attenuation.

B. Simultaneous Sound Speed, Sound Attenuation, Density, and Wall Thickness Measurements:

FIG. 9 is a schematic representation of the use of a single channel for data processing where the same frequency chirp is used as in FIG. 3 hereof, but the same data are simultaneously processed in a different manner, as illustrated in brackets, 60, to obtain the pipe wall thickness, the sound speed and the fluid attenuation. Both transmit frequency chirp signal Tx, 62, and received signal Rx, 64, are digitized by ADC 35 for each channel simultaneously and in parallel. Once the data are stored in memory, 66, for each chirp, DSP 22 performs the required multiple analyses. Temperature measurement apparatus, 68, is attached to the outside surface of pipe section 16 to correct the sound speed for variations in temperature.

Figure 10:
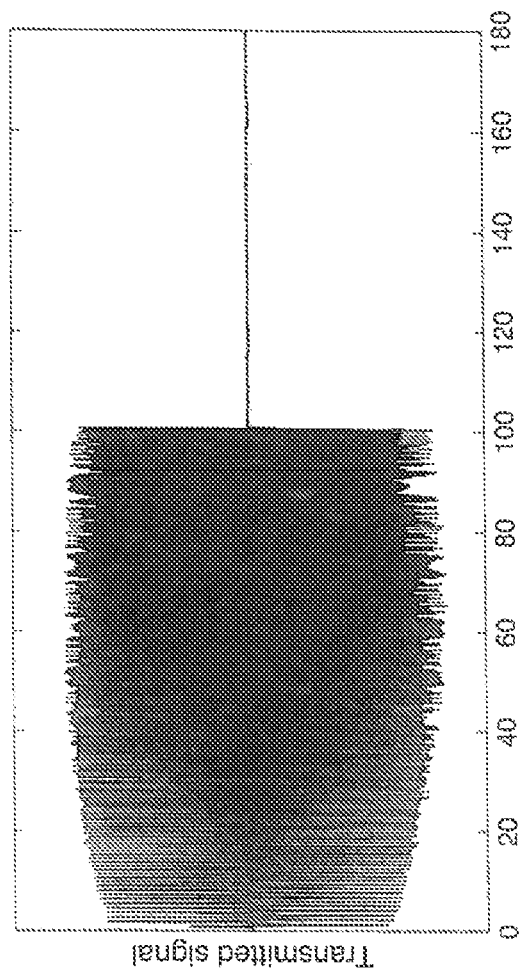
FIG. 10 is a graph illustrating a typical transmit chirp signal (1-5 MHz frequency range) and 100 us duration.
Figure 11:
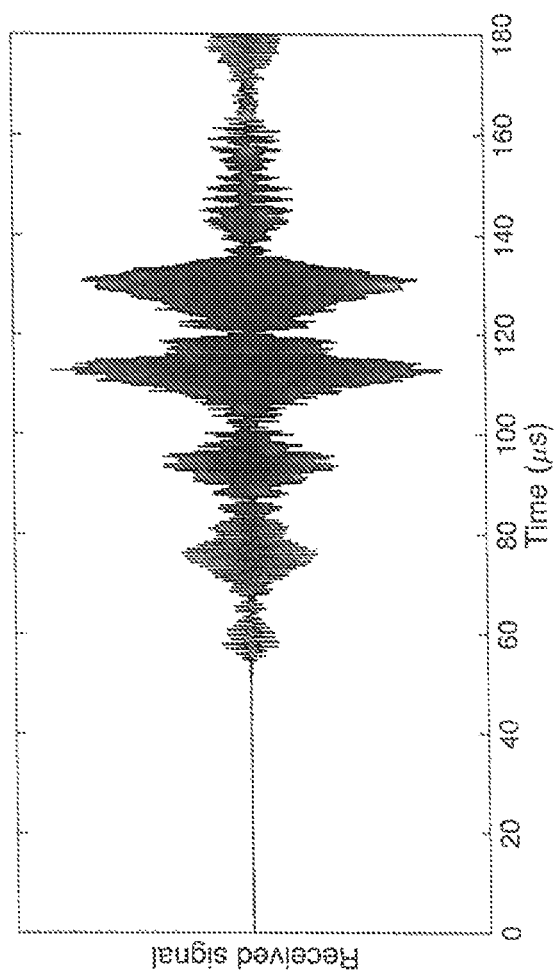
FIG. 11 is a graph illustrating the corresponding receive signal for the transmit chirp shown in FIG. 10 in a fluid (water-oil mixture) flowing through a vertical steel pipe (3-inch diameter) in a flow loop.

FIG. 10 shows a typical transmit chirp signal (1-5 MHz frequency range) and 100 microsecond duration, while FIG. 11 illustrates the corresponding receive signal in a fluid (water-oil mixture) flowing through a vertical steel pipe (3-inch diameter) in a flow loop. The received signal shown in FIG. 11 is delayed due to the passage through the fluid inside the pipe and through the pipe wall. Only the first pass of the signal is shown and not the subsequent reflections within the fluid path. Wall resonances are clearly seen as amplitude modulation.

B.1. Sound Speed:

There are three ways sound speed can be determined: (1) de-chirp, (2) cross-correlation, and (3) signal deconvolution. In all cases, both transmit and receive signals are required. Analysis may be performed as follows:

The transmitted signal x(t) is a linear chirp represented by the equation $$x(t) = \sin\left(\omega_0 + \frac{1}{2}\dot{\omega}t^2\right)$$

where $\omega_0$ is the starting chirp frequency and $\dot{\omega}$ is the rate of change of the chirp frequency. If $t_f$ is the total transit time delay, then the received signal y(t) is given by $$y(t) = x(t - t_f) * u(t - t_f)$$
$$= \sin\left[\omega_0(t - t_f) + \frac{1}{2}\dot{\omega}(t - t_f)^2\right]$$

where u(t) is the unit step function. Multiplying the transmitted and received signals gives $$x(t) \times y(t) = \sin\left(\omega_0 t + \frac{1}{2}\dot{\omega}t^2\right) \times \sin\left[\omega_0(t - t_f) + \frac{1}{2}\dot{\omega}(t - t_f)^2\right] \cdot u(t - t_f)$$
$$= \frac{1}{2}\left[\cos(\dot{\omega}t_f\hat{t} + \hat{\phi}) - \cos\{(2\omega_0 + \dot{\omega}t_f + \dot{\omega}\hat{t}\hat{t} + \hat{\phi}\}\right] \cdot u(\hat{t})$$

where $\hat{t} = t - t_f$ and $$\hat{\phi} = \left(\omega_0 + \frac{1}{2}\dot{\omega}t_f\right)t_f.$$

Figure 12:
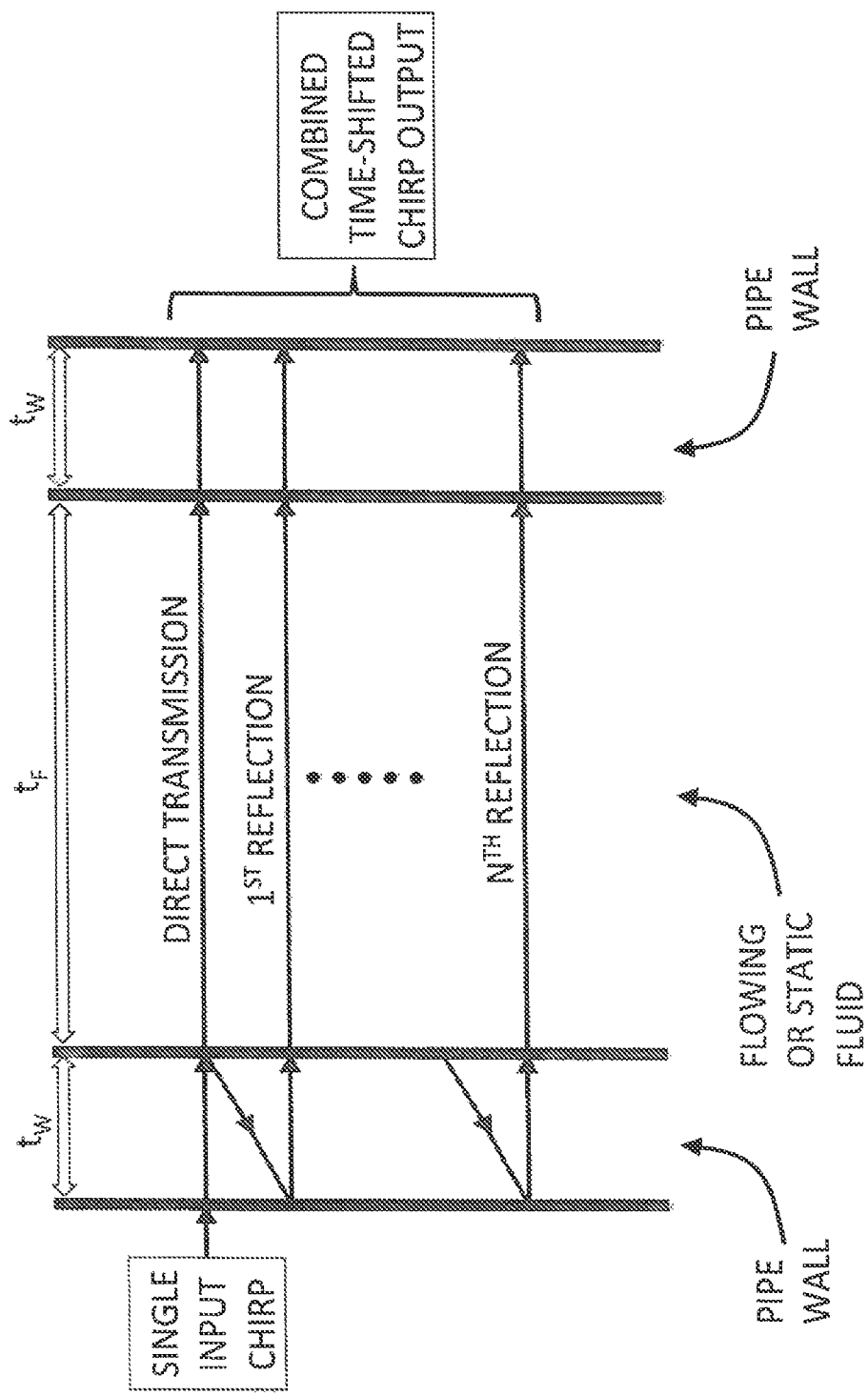
FIG. 12 is a schematic representation of acoustic wave propagation paths though a fluid filled pipe.

The effect of multiplying the transmitted signal x(t) with the received signal y(t), is the generation of a sinusoid at frequency $\omega t_f$, called the drone, and a linear chirp. Thus, by measuring the frequency of the drone, it is possible to calculate the total transit time delay $t_f$. FIG. 12 is a schematic representation of acoustic wave propagation paths though a fluid filled pipe. Using the "de-chirp" method for a signal undergoing multiple reflections (FIG. 12), the product of these chirps results in a signal that has multiple peaks (FIG. 13), each corresponding to a slightly delayed arrival of the transmitted signal; a similar pattern of maxima is seen when the transmitted signal is cross-correlated with the received signal (FIG. 14). The envelope of the cross-correlation (not shown in FIG. 14) is identical to the de-chirp signal. The first peak corresponds to the arrival of the first transmitted wave, while the second peak corresponds to the first reflection, and so on, as shown in FIG. 12. The time to first peak is thus the total time 't' that includes the propagation time through the fluid $t_f$ (needed for fluid sound speed determination) and the pipe wall on both sides $2 \cdot t_d$. Therefore, in order to obtain the speed of sound in the fluid, the time difference between the first peak and the second peak or any two subsequent peaks is subtracted from the first peak. This is because the peaks are equi-distant in time and represent the pipe wall thickness. Since the pipe dimensions are known, the path length through the fluid is known and the fluid sound speed is pathlength/$t_f$.

Figure 13:
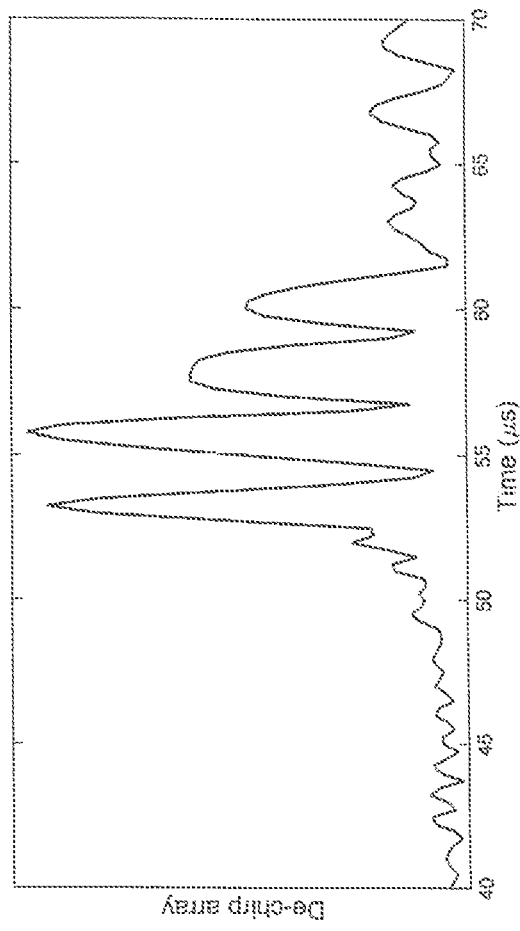
FIG. 13 illustrates the results of the de-chirp operation on the example transmitted and received signals.
Figure 14:
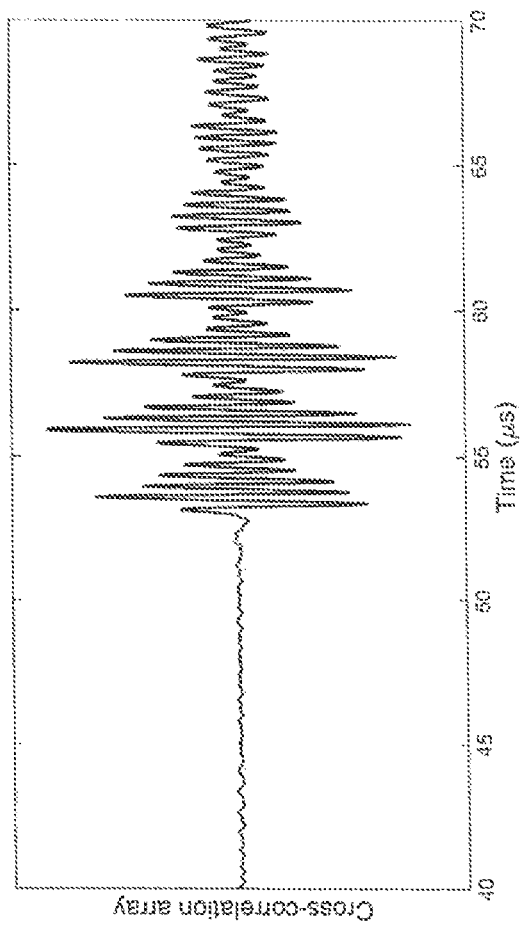
FIG. 14 illustrates the results of the cross-correlation operation on the example transmitted and received signals.

The time-of-flight can also be determined using a deconvolution process that uses the transmitted and the received signals but, in this situation, the impulse response of the system is determined, which appears the same as the de-chirp and the cross-correlation data (FIGS. 13 and 14).

Figures 15, 16:
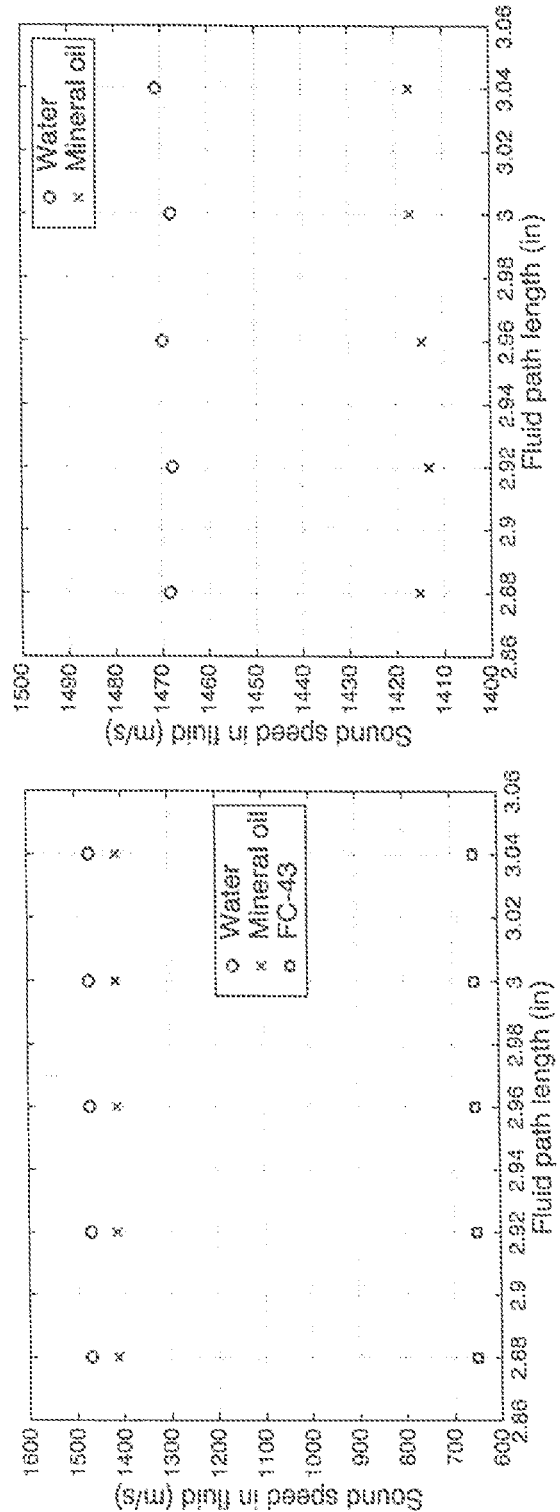
FIG. 15 illustrates the calculated sound speed in chosen fluids as a function of fluid path length in a steel pipe.
FIG. 16 illustrates the calculated sound speed in chosen fluid as a function of fluid path length in an aluminum pipe.

Measurements with different fluids (water, mineral oil and FC-43) and different pipe materials (steel, aluminum) with changing geometry show that the present method can accurately determine sound of speed in the fluid medium independent of pipe material or dimensions. To demonstrate this, measurements were made in two different pipes with each pipe having stepped diameters; therefore, measurements of different fluid path-lengths and wall thicknesses could readily be measured. The transducer position along the pipe length was moved for different path length measurements. FIG. 15 illustrates the measured sound speed in chosen fluids as a function of fluid path length in a steel pipe, while FIG. 16 illustrates the measured sound speed in chosen fluid as a function of fluid path length in an aluminum pipe. This shows that the sound speed measurements were consistent independent of the fluid pathlength.

B.2. Wall Thickness:

As described above, since the difference between detected consecutive arrivals is due to the additional passage of the ultrasonic wave through the pipe walls, a measure of the time-of-flight through the pipe wall may be made simultaneously with the time-of-flight through the fluid medium itself. The time difference between any two consecutive peaks in the de-chirp data and the envelope of the cross-correlation data provides a measure of the wall thickness as long as the wall is uniform along the circumference.

The autocorrelation approach represents another technique for measuring wall thickness. In this approach, the transmitted signal is not used; only the received signal is employed. FIGS. 17A-17C pictorially illustrate wall thickness determination using the received signal only, with FIG. 17A representing a typical received signal, FIG. 17B illustrating a fast Fourier Transform, FFT, of this signal showing a periodic pattern of wall resonances that occur at integral numbers and are equally spaced in frequency, and FIG. 17C Illustrating auto-correlation of the data in FIG. 17B showing a pronounced peak corresponding to the average peak spacing in FIG. 17B. If the pipe material is known or the pipe outer dimension is measured, the wall thickness can be accurately determined. However, for monitoring variations in wall thickness, the auto-correlation peak position is used.

Figures 18, 19:
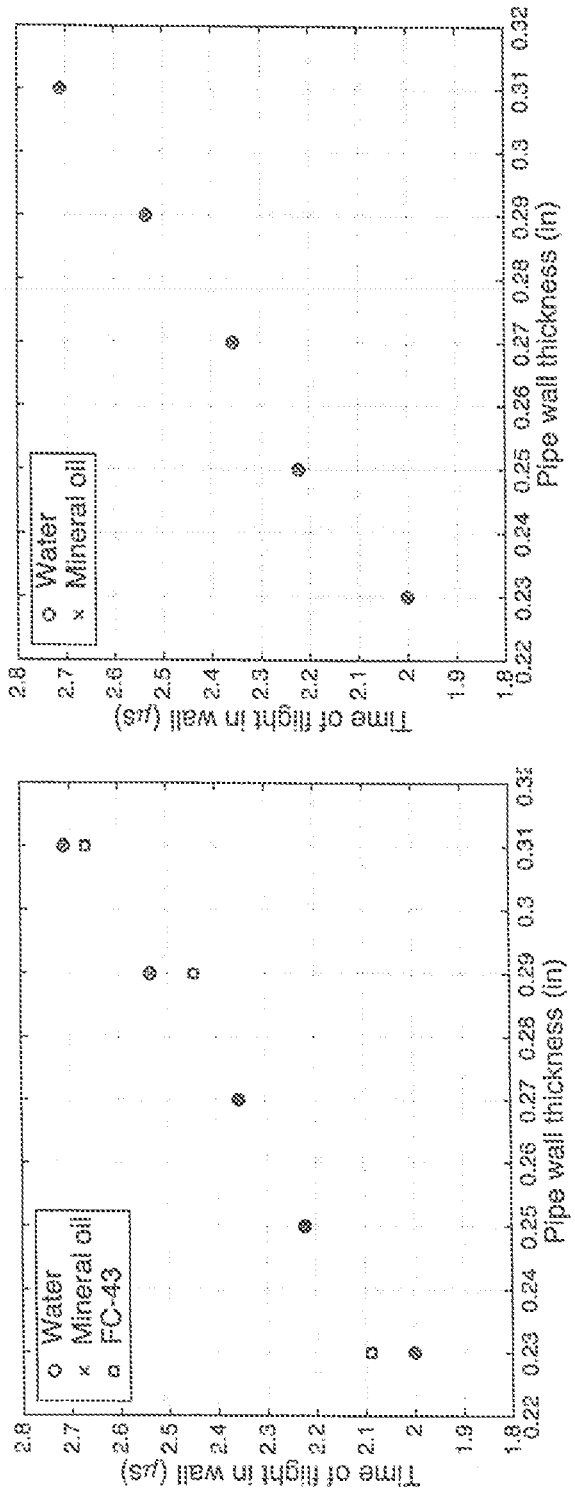
FIG. 18 illustrates the measured wall time-of-flight as a function of pipe wall thickness for a steel pipe.
FIG. 19 illustrates the calculated wall time-of-flight as a function of pipe wall thickness for an aluminum pipe.

FIG. 18 is a graph of the measured wall time-of-flight as a function of pipe wall thickness for a steel pipe, while FIG. 19 is a graph of the derived wall time-of-flight as a function of pipe wall thickness for an aluminum pipe. FIGS. 18 and 19 derive from measurements made on a steel pipe and an aluminum pipe having stepped wall thicknesses and demonstrate that accurate determination of time-of-flight through the pipe wall is independent of the fluid contained therein and can therefore provide real-time measurement of wall thickness in a pipe.

B.3. Sound Attenuation And Density:

Water-cut (oil-water composition) measurements based on sound speed alone are problematic in wells where the temperature is low. At such low temperatures, the difference in sound speed between crude oil and process water becomes small and many cases become the same as may be observed in FIG. 20A. This makes the sound speed based water-cut measurements impossible or highly inaccurate when measurements can be made. By contrast, sound attenuation varies exponentially with temperature and diverges at low temperatures as shown in FIG. 20B. Accurate attenuation measurement may solve this problem. In addition, fluid density provides another physical parameter of the fluid, making the measurements more robust. In accordance with embodiments of the present invention attenuation measurements can be made simultaneously and in real-time with other parameters using the same apparatus, and frequency chirp excitation, but the data are processed differently.

The following describes the frequency domain ratio approach for sound attenuation measurements. FIGS. 21A and 22A show the received signal for chirp pulses transmitted through the pipe wall and the fluid inside (See FIG. 9 for the measuremnt details), for water and crude oil, respectively. Referring to FIG. 12, it is seen that the direct path chirp signal is detected first and then the first reflected signal (first echo) through the liquid path follows. In FIGS. 21A and 22A, these directed path and the first reflected signal show up as two separate groups (bursts) of signals. The amplitude of the received signal is modulated by pipe wall resonance that represents multiple reflections within the wall. The effect of attenuation is qualitatively observed in the water data (low attenuation) as compared to the data for crude oil (more attenuating) from the magnitude of the signal decay between the first pass (direct path signal) and the second pass (first echo) bursts. This decay in magnitude is due to the signal having traveled two additional pathlengths for the 2nd pass signal and is thus further attenuated because of the sound attenuation in the fluid. This attenuation is frequency dependent and the attenuation varies as square of the frequency. The processing involves windowing the two signal bursts, the first pass (direct path signal) and the first echo signal. These windowed time-domain signal bursts are then converted to the frequency domain using fast Fourier Transform (FFT) processing. The two FFTs are shown in FIGS. 21B and 22B with the top curve representing direct path signal and the lower curve representing the first echo. The peaks in each curve are due to resonance in the pipe wall and mirror the transmitted signal shown in FIGS. 21A and 21B. The FFT of the $1^{st}$ pass (direct path) and the 2nd pass (first echo) are then divided to cancel out any variation in the original excitation signal amplitude and all other factors that are common to both pulse groups.

FIGS. 21C and 22C show the natural logarithm of the ratio of these two FFTs plotted against the square of the frequency, again for water and crude oil, respectively. A linear fit to the curve is constructed that touches only the lowest points in the curve (the baseline) over the frequency range. This is due to extra energy loss as a result of pipe wall resonance, and therefore the peak regions in the ratio curve are avoided. Only the values away from the peak regions provide accurate measurement, and thus the baseline linear fit is used. This straight line behavior of the baseline arises from the following equation $$\ln\left(\frac{FFT(\text{1st pass})}{FFT(\text{2nd pass})}\right) = 2\alpha L f^2 - \ln(R^2),$$

where, a is the sound attenuation in the fluid, L is the fluid path inside the pipe (internal diameter of the pipe), f is the frequency and R is the reflection coefficient at the pipe wall/fluid interface. This reflection coefficient is related to the acoustic impedance Z (sound speed×density) mismatch of the wall material and that of the fluid. From the above equation, the slope of the straight line is simply $2L\alpha$ and since L is known, the sound attenuation can be extracted from the measurement. Indeed the values determined show that attenuation is crude oil is much higher than in water, $1729.1 \times 10^{-3}$, as compared to $58.8 \times 10^{-3}$ Np m$^{-1}$ MHz$^{-2}$. The frequency region for measurement and the pipe diameter are such that the sound beam diffraction effects are minimal and can be ignored. For larger diameter pipes and lower frequencies, it will be appropriate to include loss due to diffraction in the attenuation measurement. The intercept of the line on the y-axis (vertical axis) is $\ln(R^2)$. R is defined as $$R = \left(\frac{Z_w - Z_L}{Z_w + Z_L}\right)^2,$$

where the suffix w and L represent the acoustic impedance of the pipe wall and the liquid, respectively. Since the properties of the pipe wall are known, and the sound speed of the liquid inside the pipe is determined from the measurement, the liquid density can be now extracted from the intercept of the straight line.

Figure 23:
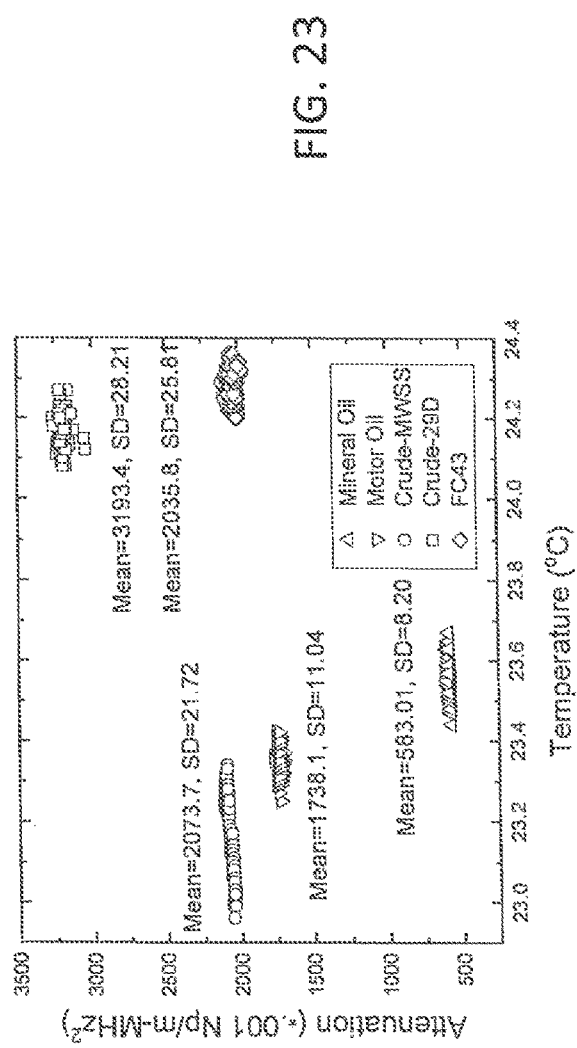
Figure 24:
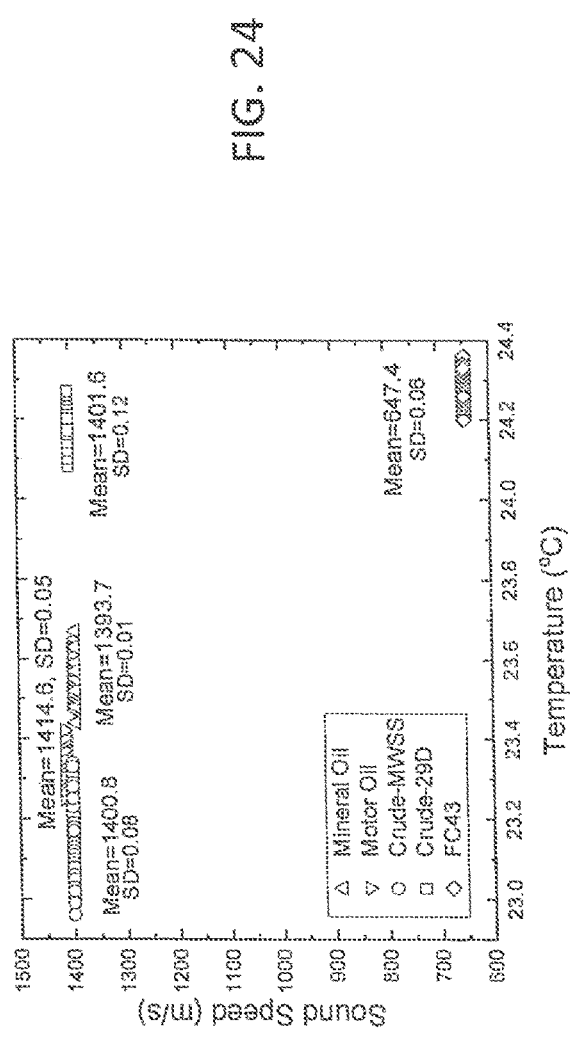
FIG. 24 is a graph of the measurements of sound speed for the same fluids as displayed in the graph of FIG. 23, above, and at the same temperaure, showing little variation in sound speed values for these fluids.

The results of the simultaneous attenuation and sound speed measurements using the above-described method for several fluids (oils and water) are presented in FIGS. 23 and 24, respectively. The temperature variation is only 2° C., and therefore the temperature effect is not readily observed as compared with that shown in FIGS. 20A and 20B. However, it is worth comparing the sound speed measurements for the same fluids at the same temperature range made simultaneously using the present apparatus. The sound speed in the measured range shows little variation among all the oils and water except for FC43 (fluorinert, which is in a different class of liquid than oil and water) that is included as a check on the measurements; therefore it is difficult to determine fluid compositions based on sound speed alone at low temperatures for oil that shows a cross-over behavior in sound speed (see FIG. 20B). By contrast, the attenuation measurements (see FIG. 23) show clear discrimination of the oils and water.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the Invention be defined by the claims appended hereto.

What is claimed is:

1. An apparatus for non-invasive, simultaneous measurement of composition, density, fluid flow rate, wall thickness, and sound attenuation of a multiphase fluid comprising at least one liquid component and gas flowing in a pipe having a wall, an outside surface and an axis, comprising:
    a first transmitting transducer in ultrasonic communication with the outside surface of said pipe for generating a first acoustic frequency chirp signal having a selected frequency range and duration in said multiphase fluid;
    a second acoustic transmitting transducer in ultrasonic communication with the outside surface of said pipe, disposed a chosen distance downstream from said first transmitting transducer for generating a second acoustic frequency chirp signal having the selected frequency range and duration in said multiphase fluid;
    a wave generator for generating an acoustic frequency chirp signal for causing said first transmitting transducer and said second transmitting transducer to simultaneously generate the first acoustic frequency chirp signal and the second acoustic frequency chirp signal, respectively, the acoustic frequency chirp signal having a duration shorter than about twice the time it takes for the generated acoustic frequency chirp signal to traverse said multiphase fluid;
    a first receiving transducer in ultrasonic communication with the outside surface of said pipe diametrically opposed to said first transmitting transducer for receiving the first acoustic frequency chirp signal generated by said first transmitting transducer after the first acoustic frequency chirp signal passes through said multiphase fluid, and for producing a first electrical signal in response thereto;
    a second receiving transducer in ultrasonic communication with the outside surface of said pipe diametrically opposed to said second transmitting transducer for receiving the second frequency chirp signal generated by said second transmitting transducer after the second frequency chirp signal passes through said multiphase fluid, and for producing a second electrical signal in response thereto;
    a first analog-to-digital converter for receiving the first electrical signal from said first receiving transducer, and for generating a first digital signal therefrom;
    a second analog-to-digital converter for receiving the second electrical signal from said second receiving transducer, and for generating a second digital signal therefrom; and
    a digital signal processor for controlling said wave generator, and for receiving the first digital signal and the second digital signal, and for storing and processing the first digital signal and the second digital signal.

2. The apparatus of claim 1, wherein said first transmitting transducer, said first receiving transducer, said second transmitting transducer, and said second receiving transducer, comprise piezoelectric transducers.

3. The apparatus of claim 2, wherein said first transmitting transducer, said first receiving transducer, said second transmitting transducer, and said second receiving transducer comprise curved surfaces which are equal to the curvature of the outside surface of said pipe.

4. The apparatus of claim 1, wherein said pipe has an outer diameter, and the chosen distance between said first transmitting transducer and said second transmitting transducer is between about 1 and approximately 3 pipe diameters.

5. The apparatus of claim 1, wherein either:
the acoustic frequency chirp signal further comprises frequencies between about 300 kHz and approximately 5 MHz;
or
the acoustic frequency chirp signal further has a duration between about 10 µs and approximately 1 ms.

6. The apparatus of claim 1, wherein said wave generator comprises a dual channel wave generator.

7. The apparatus of claim 1, further comprising a first amplifier for amplifying the first electrical signal produced by said first receiving transducer, and a second amplifier for amplifying the second electrical signal produced by said second receiving transducer.

8. The apparatus of claim 1, wherein said at least one liquid component of said multiphase fluid comprises a liquid hydrocarbon or oil, and said gas comprises at least one hydrocarbon.

9. The apparatus of claim 1, further comprising a thermometer attached to the outside surface of said pipe for determining the temperature of said multiphase fluid.

10. A method for non-invasive, simultaneous measurement of composition, density, fluid flow rate, wall thickness, and sound attenuation of a multiphase fluid comprising at least one liquid component and gas flowing in a pipe having a wall, an outside surface and an axis, comprising:
generating first acoustic frequency chirp signals in the multiphase fluid using a first transmitting transducer in ultrasonic communication with the outside surface of the pipe;
generating second acoustic frequency chirp signals in the multiphase fluid using a second acoustic transmitting transducer in ultrasonic communication with the outside surface of the pipe, disposed a chosen distance downstream from the first transmitting transducer, simultaneously with the generation of the first acoustic frequency chirp signals;
receiving the first acoustic frequency chirp signals after the first acoustic frequency chirp signals pass through the multiphase fluid, and producing first electrical signals in response thereto using a first receiving transducer in ultrasonic communication with the outside surface of the pipe diametrically opposed to the first transmitting transducer;
receiving the second acoustic frequency chirp signal after the second frequency chirp signal passes through the multiphase fluid, and producing second electrical signals, in response thereto using a second receiving transducer in ultrasonic communication with the outside surface of the pipe diametrically opposed to the second transmitting transducer;
simultaneously calculating the root-mean-square values for each first electrical signal and each second electrical signal;
inserting the root-mean-square values for the first electrical signal into a queue for a first, first-in-first-out memory, and continuously inserting the root-mean-square values for the second signal into a queue for a second, first-in-first-out memory, whereby a first waveform and a second waveform are generated;
cross-correlating the first waveform with the second waveform, whereby a time delay in a fluctuation in the first waveform and observed in the second waveform is calculated, from which the flow velocity of the multiphase fluid is determined;
determining the transit time of the first acoustic frequency chirp signal through the fluid from which the composition of the multiphase fluid is calculated;
obtaining a fast Fourier transform of a first received acoustic frequency chirp signal, from which the wall thickness is obtained; and
measuring the decay in amplitude of a first received acoustic frequency chirp as a function of number of traverses of the multiphase fluid, from which the sound attenuation and the density of the multiphase fluid is obtained.

11. The method of claim 10, further comprising the step of bandpass frequency filtering each first electrical signal and each second electrical signal over a chosen frequency range before said step of simultaneously calculating the root-mean-square values for each first electrical signal and each second electrical signal.

12. The method of claim 10, wherein said step of determining the transit time of the first acoustic frequency chirp signal through the fluid comprises multiplying the first acoustic frequency chirp signal with the first received acoustic frequency chirp signal.

13. The method of claim 10, further comprising the steps of:
determining the temperature of said multiphase fluid; and correcting the composition thereof.

14. The method of claim 10, wherein said pipe has an outer diameter, and the chosen distance between said first transmitting transducer and said second transmitting transducer is between about 1 and approximately 3 pipe diameters.

15. The method of claim 10, wherein one of:
the first and second acoustic frequency chirp signals comprise frequencies between about 300 kHz and approximately 5 MHz;
the first and second acoustic frequency chirp signals have duration shorter than about twice the time it takes for the generated acoustic frequency chirp signals to traverse said multiphase fluid; or
the first and second acoustic frequency chirp signals have a duration between about 10 µs and approximately 1 ms.

16. The method of claim 10, wherein said at least one liquid component of said multiphase fluid comprises a liquid hydrocarbon or oil.

17. The method of claim 10, wherein:
the fluctuation in the root-mean-square of the first digital signal results from a local inhomogeneity in said multiphase fluid; and
the local inhomogeneity comprises turbulence, density fluctuations, and bubbles in said multiphase fluid.

18. The method of claim 10, wherein said step of simultaneously calculating the root mean square for each of the first digital signal and the second digital signal is performed at between 1 kHz and 20 kHz repetition rate.

19. The method of claim 10, wherein the calculation of the composition of the multiphase fluid is performed using the method chosen from cross-correlation, and deconvolution.

20. The method of claim 10, wherein measurement of composition of said multiphase fluid comprises measuring a water-cut of said multiphase fluid.

\* \* \* \* \*

UNITED STATES PATENT AND TRADEMARK OFFICE
CERTIFICATE OF CORRECTION

PATENT NO. : 10,830,735 B2  
APPLICATION NO. : 16/495612  
DATED : November 10, 2020  
INVENTOR(S) : Sinha et al.

Page 1 of 1

It is certified that error appears in the above-identified patent and that said Letters Patent is hereby corrected as shown below:

On the Title Page

Item (54) and in the Specification, Column 1, Line 4, "PIPE-WALLTHICKNESS" should be --PIPE-WALL THICKNESS--

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*